United States Patent
Malden

[15] 3,635,744
[45] Jan. 18, 1972

[54] TREATMENT OF CLAY

[72] Inventor: Peter James Malden, Cornwall, England

[73] Assignee: English Clays Lovering Pochin & Company, Limited, Cornwall, England

[22] Filed: June 11, 1969

[21] Appl. No.: 832,230

[30] Foreign Application Priority Data

June 14, 1968  Great Britain......................28,592/68

[52] U.S. Cl..............................106/288 B, 106/72, 23/110 P
[51] Int. Cl............................................................C09c 1/42
[58] Field of Search........................106/72, 288 B; 23/110 P

[56] References Cited

UNITED STATES PATENTS 3,353,668  11/1967  Duke.......................................106/72
3,503,499  3/1970  Allegrini et al......................106/288 B Primary Examiner—James E. Poer
Attorney—Stevens, Davis, Miller & Mosher

[57] ABSTRACT

A method of bleaching a clay which comprises forming an aqueous suspension of the clay and contacting said aqueous suspension of the clay with a gas comprising ozone.

11 Claims, 1 Drawing Figure

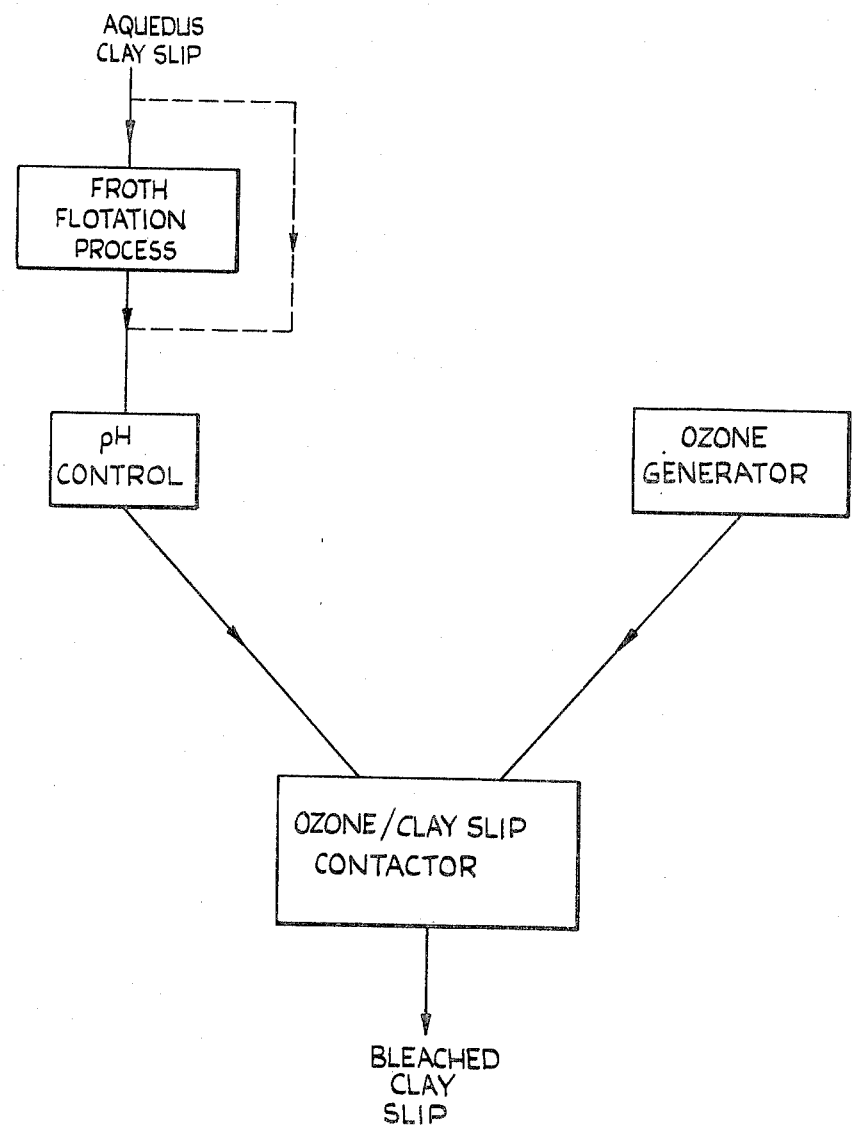

TREATMENT OF CLAY

BACKGROUND OF THE INVENTION

This invention relates to the treatment of clays and is concerned with a method of bleaching clays, more particularly but not exclusively the so-called "grey kaolins."

Certain types of kaolinitic clays, especially certain deposits in Georgia, U.S.A., are known as "grey kaolins" because they exhibit a low reflectance to light of substantially all wavelengths in the visible spectrum. These grey kaolins are unsuitable for most uses on account of their poor color, and they do not respond to techniques conventionally used for bleaching clays, for example, treatment with a reducing bleaching agent such as sodium or zinc dithionite.

U.S. Pat. specification No. 3,353,668 discloses a method of increasing the brightness of grey kaolin clays which method comprises the steps of (a) forming an aqueous slip, or suspension, consisting essentially of water, the grey kaolin clay and an oxidizing agent which is a water-soluble inorganic compound containing molecularly available oxygen, (b) agitating said slip until oxidation takes place, and (c) thereafter subjecting an aqueous slip of the kaolin clay to the action of a reducing bleaching agent. According to U.S. Pat. specification No. 3,353,668 the preferred, water-soluble inorganic compound containing molecularly available oxygen is potassium permanganate and it is recommended that acidic reaction conditions, i.e., a pH below 5.0, be used. Among other water-soluble inorganic oxidizing agents containing molecularly available oxygen mentioned are sodium bichromate, sodium chlorate, sodium peroxide, ammonium persulfate and oxygen gas; but in many cases, for example, in the case of sodium peroxide and oxygen gas, the improvement in the brightness of the clay which is obtained is very small. Moreover, the time required to achieve the desired result is long, for example, using potassium permanganate at room temperature and with moderate agitation of the aqueous slip requires from 10 to 80 hours. Thus, while the process described in U.S. Pat. specification No. 3,353,668 does enable the brightness of a grey kaolin clay to be improved it suffers from a number of significant disadvantages, not least of which are the need to follow the oxidative process with a reducing bleaching process and the fact that the process leaves residual inorganic compounds in solution in the treated aqueous clay slip which residual inorganic compounds may have a deleterious effect on the rheological properties of the clay.

It is an object of the present invention to provide a process for bleaching clays, more particularly the so-called grey kaolins, which enables a significant increase in the brightness of the clay to be obtained without the aforesaid disadvantages.

SUMMARY OF THE INVENTION

Accordingly, the present invention provides a method of bleaching a clay which method comprises forming an aqueous suspension of the clay, and contacting said aqueous suspension of the clay with a gas comprising ozone.

The gas comprising ozone, which is contacted with the aqueous suspension of the clay, can be, for example, ozonized air or ozonized oxygen.

The aqueous suspension of the clay can be contacted with the gas comprising ozone in any device designed for rapidly and efficiently bringing a gas and a liquid into equilibrium with each other, suitable devices being, for example, a packed column, a gas/liquid contactor with a porous plate to distribute the gas or a device in which the gas is compelled to follow a tortuous path through the liquid such as occurs in a Friedrich gas washing bottle. The essential requirement is that sufficient ozone to react with the discoloring material present in the clay should be dissolved in the aqueous clay suspension. A preferred method of carrying out the invention is to pass a dilute solution of ozone in oxygen or air continuously through the aqueous clay suspension in the form of fine bubbles. In this way it is possible to ensure that the concentration of ozone in the aqueous clay suspension is kept substantially constant throughout the period of treatment. Although not essential, it may be advantageous to agitate the aqueous clay suspension independently of the agitation caused by the passage of the gas comprising ozone through the slip.

The gas comprising ozone is passed through the suspension of clay in water for a time sufficient to obtain a significant increase in the brightness of the clay. The lower is the ozone concentration, the longer is the period of treatment required to bring about a desired brightness increase. However, it is found that a significant improvement in the brightness of a grey kaolin clay can be achieved by contacting an aqueous suspension of the clay with ozone for as short a time as 1 minute, although it is desirable to pass the gas comprising ozone through the suspension for at least 5 minutes. Generally, the contact time will not exceed 2 hours and it will seldom be advantageous to contact the aqueous suspension of clay with the gas comprising ozone for more than about 12 hours. The optimum contact time depends inter alia on the size of the bubbles of gas passing through the aqueous suspension and the rate of passage of the gas through the aqueous suspension.

The aqueous suspension of the clay can be contacted with the ozone at room temperature.

DESCRIPTION OF THE PREFERRED EMBODIMENTS

The pH of the aqueous suspension of the clay is preferably adjusted so that it lies in the range 4.5 to 8.5, most preferably in the range 5.5 to 8.0, and the solids content of the aqueous clay suspension should be such that the suspension is sufficiently fluid to allow the passage of bubbles of gas therethrough. Preferably, the clay is deflocculated since this allows a greater mass of clay to be treated in a given volume of the aqueous suspension. Preferred deflocculating agents are water-soluble condensed phosphates, or water-soluble salts of polyacrylic acid or polymethacrylic acid having a molecular weight in the range 500 to 10,000 or water-soluble polysilicates. For practical purposes, the upper limit of the solids content for an aqueous suspension of deflocculated clay will generally be about 70 percent by weight and for a suspension of a flocculated clay will generally be about 45 percent by weight.

As indicated above, the present invention is of particular value for the treatment of so-called grey kaolins, but it will be appreciated that the method of the invention can also be used to increase the brightness of kaolinitic clays in general, and also other clays, e.g., bentonite, attapulgite, pyrophyllite and halloysite.

Advantageously, the method of the invention is carried out after the clay has been treated, for example, by a froth flotation process, so as to separate mineral impurities therefrom. The froth flotation process is advantageously carried out in the following manner:

The crude clay is formed into an aqueous suspension, or slurry, having a solids content of at least 30 percent by weight, preferably from 35 to 50 percent by weight, and then the slurry conditioned at said solids content for a time sufficient to dissipate therein at least 20 horsepower hours of energy per ton of dry clay. During or before the conditioning of the clay slurry there is mixed therewith a deflocculant, an alkali to raise the pH of the aqueous clay slurry to an alkaline value, a collector for the mineral impurities, and an activator. After conditioning of the clay slurry, there is added thereto a frothing agent and the reagentized aqueous clay slurry this formed is then introduced, preferably after dilution to a solids content in the range 15 percent to 30 percent by weight, into a froth flotation cell having a central, internal, submerged impellor wherein it is subjected to a froth flotation process. The purified clay is collected as the machine discharge product.

The deflocculant used in this process can be, for example, sodium silicate which is advantageously used in an amount varying from 0.45 to 5.5 kg. per ton of dry clay.

The alkali used to raise the pH of the aqueous clay slip to an alkaline value can be ammonium hydroxide, although other similar materials may alternatively be used. In the case of ammonium hydroxide there will generally be used from 0.45 to 5.5 kg. per ton of dry clay.

The collector for the mineral impurities can be, for example, a fatty acid containing from 8 to 20 carbon atoms and preferred collectors are oleic acid and lauric acid; in the case of oleic acid there will generally be used from 0.65 to 3.5 kg. of oleic acid per ton of dry clay.

The frothing agent can be, for example, pine oil or a methyl or ethylether of polypropylene glycol.

The activator can be, for example, a water-soluble salt of a heavy metal or an alkaline earth metal, for example, lead acetate or calcium chloride.

The method of the invention is shown schematically on the accompanying drawing.

The invention is further illustrated by the following examples.

EXAMPLE 1

A quantity of grey kaolin (i.e., a kaolin having a poor percentage reflectance to light of substantially all wavelengths in the visible spectrum) from Washington County, Georgia, U.S.A. and having a particle size distribution such that 5 percent by weight consisted of particles larger than a No. 300 mesh B.S. (No. 270 mesh A.S.T.M.) sieve, 20 percent by weight of particles larger than 10 microns equivalent spherical diameter and 55 percent by weight of particles smaller than 2 microns equivalent spherical diameter, was suspended in water and deflocculated with 0.4 percent by weight of tetrasodium pyrophosphate, based on the weight of dry clay. The pH of the suspension was adjusted to 8 with sodium hydroxide. The clay was refined by gravitational sedimentation for a time equivalent to 25 hours per foot depth (49.2 minutes per cm.) of suspension and at the completion of this time the supernatant suspension which predominantly comprised particles smaller than 2 microns equivalent spherical diameter was separated from the sediment, flocculated, filtered and dried. Three samples of the thus refined clay were then treated as follows:

SAMPLE 1

Ten g. of the dried clay were suspended in water and the volume made up to 100 ml. The pH of the suspension was adjusted to 2.8 with dilute hydrochloric acid and an amount of a conventional reductive bleaching agent, viz sodium dithionite, equivalent to 2.7 kg. of sodium dithionite per ton of dry clay was added with stirring. The suspension containing the bleaching agent was stirred for 10 minutes after which time the pH was adjusted to 1.0 with dilute hydrochloric acid to keep the ferrous iron compounds in solution and the suspension filtered. The filter cake was then reslurried with distilled water and the pH adjusted to 4.5 with sodium hydroxide. The clay was filtered and dried at 80° C. and the percentage reflectances of the dry clay to light of wavelengths 458 and 574 millimicrons were then measured using an Elrepho brightness meter.

SAMPLE 2

Twelve g. of the dried clay were suspended in water and the volume made up to 80 ml. The pH of the suspension was adjusted to 8 with sodium hydroxide in order to deflocculate the clay, and a stream of ozonized oxygen prepared by passing dry oxygen gas from a cylinder through a conventional Brodie ozonizer was passed through the suspension in a Friedrich gas washer at room temperature and at a rate of 50 ml. of gas per minute. The ozonized oxygen contained 1.5 percent by weight of ozone.

At the end of 4 hours the pH of the suspension was adjusted to 4.5 with hydrochloric acid and the kaolin was filtered and dried at 80° C. The percentage reflectances of the dry clay to light of 458 and 574 millimicrons were then measured using an Elrepho brightness meter.

SAMPLE 3

The procedure used on sample 2 was repeated under identical conditions except that the stream of ozonized oxygen was passed through the suspension for a period of 10 hours.

The results obtained are as set out in table I below.

TABLE I

| | % Reflectance to light of: | |
|---|---|---|
| | 458 millimicrons wavelength | 574 millimicrons wavelength |
| Unbleached, refined kaolin | 78.7 | 85.7 |
| Sample 1 | 78.9 | 85.7 |
| Sample 2 | 85.2 | 91.0 |
| Sample 3 | 85.7 | 91.4 |

EXAMPLE 2

Three samples of the same raw grey kaolin as was used in example 1 were treated for the removal of titaniferous impurities by a froth flotation process as described below:

The crude clay was mixed with water to form a slurry containing 40 percent by weight of solids and the slurry was conditioned for 60 minutes in a froth flotation cell having a central, internal, submerged impellor, but run with the air intake closed. The amount of energy dissipated in the slurry was 28 horsepower hours per ton of solids and the following reagents were added prior to conditioning:

| Reagent | Quantity |
|---|---|
| Ammonium hydroxide | 2.2 kg. of $NH_4OH$ per ton of dry clay |
| Oleic acid | 1.8 kg. per ton of dry clay |
| Calcium chloride | 1.1 kg. per ton of dry clay |
| Sodium silicate | 1.8 kg. per ton of dry clay |

The pH of the suspension was 9.0. After conditioning, the suspension was diluted to 18 percent by weight of solids, pine oil at the rate of 0.36 kg. per ton of dry clay was added and the suspension transferred to a laboratory flotation cell having a width of 150 mm. and a central, internal, submerged impellor having a diameter of 75 millimeters. The flotation cell was run with the air intake open for 30 minutes and the machine discharge product comprising the purified kaolin was examined for percentage reflectance to light of 458 and 574 millimicrons wavelengths.

The three machine discharge products were flocculated, filtered and dried to form purified samples of grey kaolin. From each purified sample there was formed a suspension of 80 ml. total volume in exactly the same way as described in example 1 in connection with sample 2. A stream of ozonized oxygen containing 1.5 percent by weight of ozone was passed at room temperature through each sample at a rate of 50 ml. of gas per minute for a period of 10 hours, using a Friedrich gas washer. Each sample was then flocculated, filtered and dried as described in example 1 and the percentage reflectance to light of 458 and 574 millimicrons wavelength was measured using an Elrepho brightness meter. The results are given in table II below.

TABLE II

| | % Reflectance to light of: | |
|---|---|---|
| | 458 | 574 |

|  | millimicrons wave length | millimicrons wavelength |
| --- | --- | --- |
| Sample 1 | | |
| a. crude clay | 77.1 | 83.2 |
| b. froth flotation product before treatment with ozonized oxygen | 84.0 | 88.6 |
| c. froth flotation product after treatment with ozonized oxygen | 88.2 | 91.5 |
| Sample 2 | | |
| a. crude clay | 77.1 | 83.2 |
| b. froth flotation product before treatment with ozonized oxygen | 84.2 | 88.7 |
| c. froth flotation product after treatment with ozonized oxygen | 88.7 | 91.7 |
| Sample 3 | | |
| a. crude clay | 77.1 | 83.2 |
| b. froth flotation product before treatment with ozonized oxygen | 84.1 | 89.1 |
| c. froth flotation product after treatment with ozonized oxygen | 87.7 | 91.4 |

EXAMPLE 3

Five grey kaolins from Washington County, U.S.A., were sedimented, in the deflocculated state, and the fraction smaller than 5 microns isolated from them and dried. A sample of each clay fraction was then treated, in the form of a 17 percent by weight solids aqueous slip, with 1.8 kg. potassium permanganate per ton of dry clay at pH 3.5 for (a) 1 hr. and (b) 24 hrs. At the end of these periods the pH of each aqueous slip was adjusted to 8.5, with dilute NaOH solution, and then reduced to 3.0 by passing in $SO_2$ while the slip was stirred. After standing for 1 hour the clay was filtered off, washed on the filter and dried at 80° C.

Further samples of each grey kaolin were treated with ozonized oxygen, as described in example 1, for 1 hour. The brightness of the clays, measured in terms of the percentage reflectances to light of 458 and 574 millimicrons wavelength, are shown in table III below:

0005 NO CARD FOR THIS ILLUSTRATION.

It can be seen that in each case treatment with ozone for 1 hour gave a higher brightness than treatment with permanganate either for 1 hour or 20 hours.

EXAMPLE 4

A grey kaolin from Washington County, Georgia, U.S.A. was suspended in water and deflocculated with 0.4 percent by weight of tetrasodium pyrophosphate based on the weight of dry clay. The pH of the suspension was adjusted to 8.0 with sodium hydroxide. The clay was refined by gravitational sedimentation for a time equivalent to 235 minutes per foot depth of suspension (7.72 minutes per cm.) to obtain a fine product of which 80 percent by weight consisted of particles smaller than 2 microns equivalent spherical diameter. The fine product was then separated from the sediment, flocculated, filtered and dried. Three samples of this dried refined clay were then treated as follows:

Three 12 g. samples of the dried kaolin clay were each suspended in water and the volume made up to 80 ml. Each suspension was buffered to a different pH by suitable buffering agents and a stream of ozonized oxygen was passed through the suspension in a Friedrich gas washer at room temperature and at a rate of 50 ml. of gas per minute. The ozonized oxygen contained 1.8 percent by weight of ozone. At the end of 15 minutes the pH of each suspension was adjusted to 4.5 and the kaolin clay was filtered and dried at 80° C. The percentage reflectances of the three treated samples, and of the untreated kaolin clay, to light of 458 and 574 millimicrons wavelength were measured using an Elrepho brightness meter, and the results obtained are shown in table IV below.

TABLE IV

| | % Reflectance to light of: | |
| --- | --- | --- |
| | 458 millimicrons wavelength | 574 millimicrons wavelength |
| Unbleached, refined kaolin | 79.4 | 86.3 |
| Treated with ozone at pH 2.0 | 83.9 | 90.2 |
| Treated with ozone at pH 5.5 | 84.1 | 90.3 |
| Treated with ozone at pH 10.5 | 84.2 | 90.3 |

EXAMPLE 5

A further sample of the dried refined clay which was prepared as described in example 1 was treated as follows.

Twelve g. of the dried kaolin clay was suspended in water and the volume made up to 80 ml. The pH of the suspension was adjusted to 8 with sodium hydroxide in order to deflocculate the kaolin clay and a stream of dry oxygen gas from a cylinder was passed through the suspension in a Friedrich gas washer at room temperature and at a rate of 50 ml. of gas per minute.

At the end of 4 hours the pH of the suspension was adjusted to 4.5 with hydrochloric acid and the kaolin clay was filtered and dried at 80° C. The percentage reflectance of the dry kaolin clay to light of 458 and 574 millimicrons wavelength was then measured using an Elrepho brightness meter, and the results obtained are shown in table V below. For comparison, the brightness of sample 2 of example 1, which was treated with ozonized oxygen containing 1.5 percent by weight of ozone, under identical conditions to those described above, is also given.

TABLE V

| | % Reflectance to light of: | |
| --- | --- | --- |
| | 458 millimicrons wavelength | 574 millimicrons wavelength |
| Unbleached refined kaolin | 78.7 | 85.7 |
| Treated with dry oxygen gas | 78.8 | 85.9 |
| Treated with ozonized oxygen | 85.2 | 91.0 |

EXAMPLE 6

Further samples of a refined, dry grey kaolin from Washington County, Georgia, U.S.A. were prepared by the method described in example 3.

Two of the samples were then treated as follows:

Each sample was suspended in water to give a suspension containing 17 percent by weight of solids and the suspension was treated with 1.8 kg. of potassium permanganate per ton of clay at pH 3.5 for 1 hour and 24 hours respectively. At the end of these periods, the pH was adjusted to 8.5 with dilute sodium hydroxide solution, and then reduced to 3.0 by passing in sulfur dioxide gas while the suspension was stirred. After standing for 1 hour the clay was filtered off, washed on the filter and dried at 80° C.

A further sample of 12 g. of the dried kaolin clay was suspended in water and the volume made up to 80 ml. (13.7 percent by weight of solids). The pH of the suspension was adjusted to 8.0 with sodium hydroxide, in order to deflocculate the clay, and a stream of ozonized oxygen was passed through the suspension in a Friedrich gas washer at room temperature and at a rate of 50 ml. of gas per minute. The ozonized oxygen contained 1.5 percent by weight of ozone. At the end of 1 hour the pH of the suspension was adjusted to 4.5 with hydrochloric acid and the kaolin was filtered and dried at 80° C.

The percentage reflectances of the dry kaolin clay to light of 458 and 574 millimicrons wavelength were then measured for all the samples using an Elrepho brightness meter and the results are given in table VI below.

TABLE VI

|  | % Reflectance to light of: | |
|---|---|---|
|  | 458 millimicrons wavelength | 574 millimicrons wavelength |
| Unbleached, refined kaolin | 77.0 | 84.3 |
| KMnO₄ for 1 hour/SO₂ | 81.2 | 88.4 |
| KMnO₄ for 24 hours/SO₂ | 83.0 | 89.6 |
| Ozone for 1 hour | 84.6 | 90.9 |

Further 12 g. samples of the dried kaolin clay were treated with ozonized oxygen under identical conditions to those described above for varying lengths of time in order to determine the lengths of time for which the clay must be contacted with ozonized oxygen in order to give brightness results equivalent to those obtained after treating with potassium permanganate for 1 hour and 24 hours. It was found that the same brightness as that achieved in 1 hour by the permanganate method (i.e., 81.2; 88.4) was obtained by treating the clay with ozonized oxygen for 2.5 minutes. To achieve the brightness obtained by treatment with permanganate for 24 hours (i.e., 83.0; 89.6) the clay had to be treated with ozonized oxygen for 6.5 minutes.

I claim:

1. A method of bleaching a clay which comprises forming an aqueous suspension of the clay and contacting said aqueous suspension of the clay with a gas comprising ozone.

2. A method according to claim 1, wherein the pH of the aqueous suspension of the clay is adjusted to lie in the range 4.5 to 8.5 before the aqueous suspension of the clay is contacted with said gas comprising ozone.

3. A method of bleaching a kaolinitic clay, which comprises forming an aqueous suspension of the kaolinitic clay, adjusting the pH of the aqueous suspension of the clay to lie in the range 5.5 to 8.0, and thereafter contacting the aqueous suspension of the clay with a gas comprising ozone.

4. A method according to claim 3, wherein a deflocculating agent is added to the aqueous suspension of the clay before the aqueous suspension of the clay is contacted with said gas comprising ozone.

5. A method according to claim 3, wherein the gas comprising ozone, in the form of fine bubbles, is passed continuously through the aqueous suspension of the clay.

6. A method according to claim 3, wherein the aqueous suspension of the clay is contacted with the gas comprising ozone for from about 1 minute to about 2 hours.

7. A method according to claim 1, wherein the clay is treated, in order to separate mineral impurities therefrom, before it is contacted, in the form of an aqueous suspension, with said gas comprising ozone.

8. A method of bleaching a grey kaolin clay which comprises the steps of:
   a. subjecting the clay to a froth flotation process to separate mineral impurities therefrom and form a partially purified clay;
   b. forming said partially purified clay into an aqueous suspension;
   c. adjusting the pH of said aqueous suspension to a value in the range 5.5 to about 8.5;
   d. adding a deflocculating agent to said aqueous suspension to form a deflocculated aqueous suspension of said clay; and
   e. passing a gas comprising ozone through said deflocculated aqueous suspension for from about 5 minutes to about 2 hours.

9. A method according to claim 8, wherein said deflocculating agent is a water-soluble salt of a polyacrylic acid or polymethacrylic acid having an average molecular weight in the range 500 to 10,000.

10. A method according to claim 8, wherein said deflocculated aqueous suspension of clay has a solids content of up to about 70 percent by weight.

11. A method according to claim 8, wherein the gas comprising ozone is passed continuously through the aqueous suspension of the clay in the form of fine bubbles.

* * * * *

Disclaimer 3,635,744.—*Peter James Malden*, Cornwall, England. TREATMENT OF CLAY. Patent dated Jan. 18, 1972. Disclaimer filed Dec. 11, 1974, by the assignee, *English Clays Lovering Pochin & Company Limited.*

Hereby enters this disclaimer to claims 1, 2 and 3 of said patent.

[*Official Gazette April 8, 1975.*]